United States Patent
Koziel et al.

(10) Patent No.: US 11,483,152 B2
(45) Date of Patent: Oct. 25, 2022

(54) HIGH-PERFORMANCE SYSTEMS TO VALIDATE ISOGENY-BASED CRYPTOGRAPHY KEYS

(71) Applicant: PQSecure Technologies, LLC, Boca Raton, FL (US)

(72) Inventors: Brian C. Koziel, Plano, TX (US); Rami El Khatib, Boca Raton, FL (US); Brandon Langenberg, Boca Raton, FL (US)

(73) Assignee: PQSecure Technologies, LLC, Boca Raton, FL (US)

( * ) Notice: Subject to any disclaimer, the term of this patent is extended or adjusted under 35 U.S.C. 154(b) by 0 days.

(21) Appl. No.: 17/641,698

(22) PCT Filed: Dec. 30, 2020

(86) PCT No.: PCT/US2020/067597
§ 371 (c)(1),
(2) Date: Mar. 9, 2022

(87) PCT Pub. No.: WO2022/146437
PCT Pub. Date: Jul. 7, 2022

(65) Prior Publication Data
US 2022/0276840 A1 Sep. 1, 2022

(51) Int. Cl.
*H04L 9/30* (2006.01)
*G06F 7/58* (2006.01)
*G06F 21/60* (2013.01)

(52) U.S. Cl.
CPC ............ *H04L 9/3066* (2013.01); *G06F 7/588* (2013.01); *G06F 21/602* (2013.01); *G06F 2221/0751* (2013.01)

(58) Field of Classification Search
CPC ........ H04L 9/30; H04L 9/3066; H04L 9/3013
See application file for complete search history.

(56) References Cited

U.S. PATENT DOCUMENTS

| | | |
|---|---|---|
| 10,812,265 B1 | 10/2020 | De Quehen et al. |
| 2012/0288093 A1 | 11/2012 | Murray |
| 2018/0323973 A1 | 11/2018 | Soukharev |
| 2020/0014534 A1 | 1/2020 | Garcia Morchon et al. |
| 2020/0259648 A1 | 8/2020 | Koziel |

OTHER PUBLICATIONS

Koziel et al. "Fast Hardware Architectures for Super Singular Isogeny Difle-Hellman Key Exchange on FGPA." In progress in cryptology—Indocrypt 2016 [online] [retreieved Oct. 9, 2021) <URL: https://link.springer.com/chapter/10.1007/978-3-319-49890-4_11 >.

*Primary Examiner* — David J Pearson
(74) *Attorney, Agent, or Firm* — Mark C. Johnson; Johnson Dalal

(57) ABSTRACT

A computer processing system for validating isogeny-based cryptography keys having an electronic computing device with an isogeny-based cryptosystem operably configured to validate public keying material including an elliptic curve by simultaneously computing an elliptic curve supersingularity check along with an elliptic curve public point check.

17 Claims, 3 Drawing Sheets

HIGH-PERFORMANCE SYSTEMS TO VALIDATE ISOGENY-BASED CRYPTOGRAPHY KEYS

FIELD OF THE INVENTION

The present invention relates generally to systems that quickly validate public keys in isogeny-based cryptosystems.

BACKGROUND OF THE INVENTION

Cryptology is the practice and study of techniques for secure communication in the presence of third parties called adversaries. More generally, cryptography is about constructing and analyzing protocols that prevent third parties or the public from reading private messages and includes various aspects in information security such as data confidentiality, data integrity, authentication, and non-repudiation. Applications of cryptography include electronic commerce, chip-based payment cards, digital currencies, computer passwords, and military communications. Cryptosystems are a suite of cryptographic algorithms needed to implement a particular security service, most commonly for achieving confidentiality. Due to the sensitive nature of internal computations required for a cryptography session, namely one utilizing post-quantum cryptography, the hardware or processing footprint must be protected from a variety of active techniques that cleverly manipulate cryptosystem inputs. As such, utilizing methods to validate this information before use can increase the security of such systems.

Notably, physical implementations of cryptosystems must protect against maliciously generated private and public keys so as not to leak critical internal information. For instance, if in an elliptic curve cryptosystem a third-party sends a public key that is not actually a point on the curve, the resulting behavior from naively utilizing this public key could reveal an internal private key. Furthermore, post-quantum cryptosystems are relatively new with many unclear attack vectors. These public keys and other inputs to a party's implementation of a cryptosystem must be validated as much as possible, but also as efficiently as possible. Among post-quantum cryptosystems, there are very few, if any, validation techniques in use.

Therefore, a need exists to overcome the problems with the prior art as discussed above.

SUMMARY OF THE INVENTION

The invention provides a system for quickly validating public keys or parameters in isogeny-based cryptosystems utilizing hard problems involving isogenies. By taking advantage of various parallel computing techniques, implementations can drastically speed up the processing time to validate essential attributes of another user's public key.

With the foregoing and other objects in view, there is provided, in accordance with the invention, a computer processing system for utilizing hard problems of isogenies. This computer processing system accepts public keying material that is equivalent to a new elliptic curve and two torsion points from outside entities to generate a shared secret for secure communications.

In accordance with a further feature of the present invention, the computer processing system simultaneously checks multiple values to find random points on this new elliptic curve to test if the elliptic curve is supersingular.

In accordance with another feature of the present invention, the computer processing system simultaneously performs scalar point multiplications on randomly found points as well as torsion points.

Although the invention is illustrated and described herein as embodied in a system for validating public keying information for isogeny-based cryptosystems, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of any processing chip. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
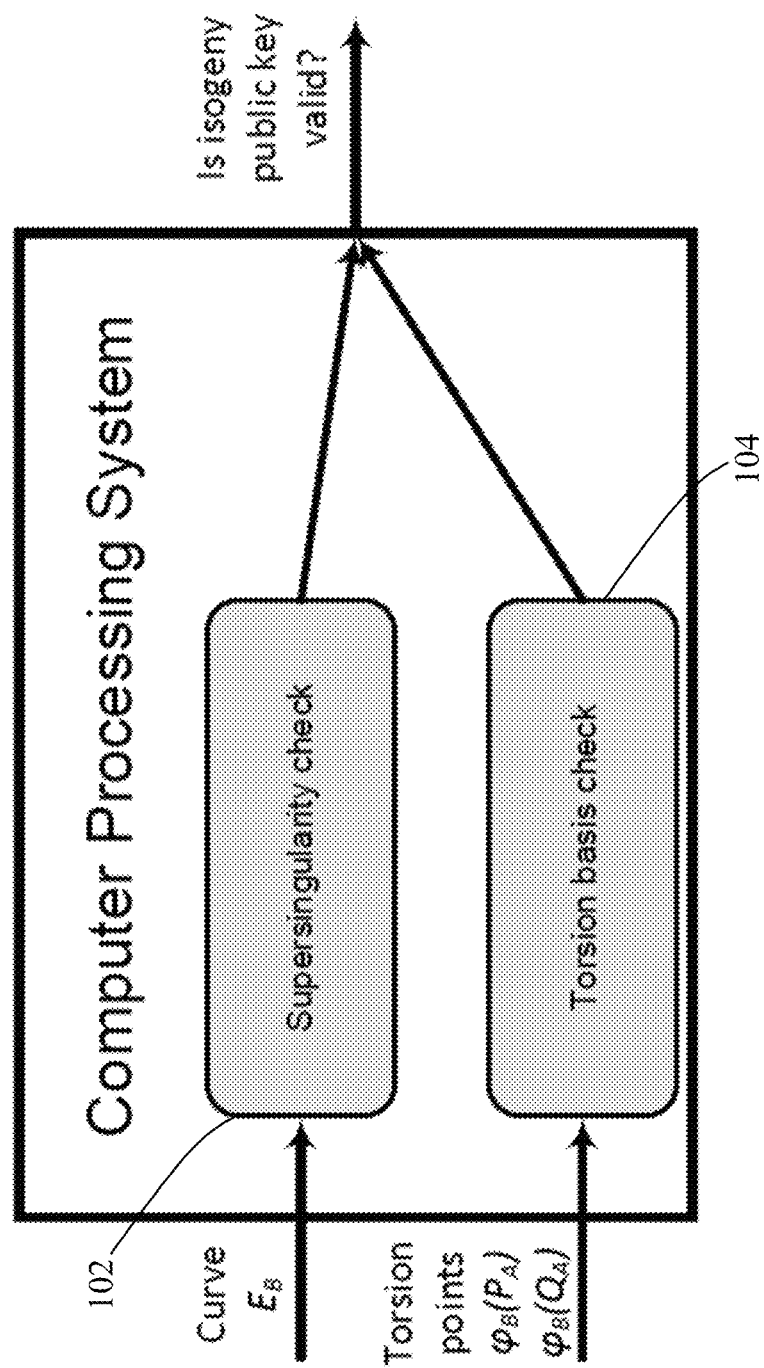
FIG. 1 illustrates a SIDH/SIKE setting where a public key composed of an elliptic curve $E_B$ and torsion basis points $\{\varphi_B(P_A), \varphi_B(Q_A)\}$ are validated in parallel by using a supersingularity checker and a torsion basis checker, respectively. These checks ensure that the public key's curve is supersingular and that the torsion basis points have the correct order and have a non-trivial Weil pairing (form a basis), which are required for a valid SIDH/SIKE public key.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides an efficient system to validate public keying material in isogeny-based cryptosystems. By eliminating data dependencies in public key validation steps, much of the complex computations can be parallelized for a multiplicative performance improvement.

The primary application for validating public keying material in a cryptosystem is to defend against fault-based attacks that target a system's response to invalid or maliciously crafted inputs. For instance, if an isogeny-based cryptosystem expects that a public key contains an elliptic curve with two points on that elliptic curve, then this must be checked. Otherwise, certain elements of point arithmetic could break down private information such as a private key.

Isogeny-based cryptography is cryptography based on isogenies, or algebraic morphisms that are surjective and have a finite kernel, among a group. In modern-day cryptography, isogenies on elliptic curve groups are thought to be a hard problem, even for quantum computers. As those of skill in the art will appreciate, an isogeny $\varphi: E_1 \rightarrow E_2$ on elliptic curves $E_1$ and $E_2$ is a non-rational map of all points on $E_1$ to $E_2$ that preserves the point at infinity. Given a finite kernel and $E_1$, it is simple to compute $E_2$, the isogeny of $E_1$ using the finite kernel. However, given only $E_1$ and $E_2$, it is a computationally intensive task to compute the finite kernel used for the isogeny from $E_1$ to $E_2$, which is the foundation of isogeny-based cryptography. Some examples of isogeny-based cryptography include, but not limited to, the supersingular isogeny Diffie-Hellman ("SIDH") key exchange protocol, commutative supersingular isogeny Diffie-Hellman ("CSIDH") key exchange protocol, supersingular isogeny key encapsulation ("SIKE") mechanism, and SeaSign isogeny signatures. Each of these are isogeny-based cryptosystems that are based on the hardness of isogenies on elliptic curves. The cryptosystem parameters differ in many ways. However, efficient implementation of these cryptosystems can be designed such that they also provide protections from outside observers.

This explanation of this innovation primarily focuses on key exchange and key encapsulation mechanism schemes protected by hard problems on isogenies of elliptic curves. In Diffie-Hellman key exchange systems, for instance, two parties agree on a shared secret by applying their respective secret to generate a public key, sending their public key to each other, and applying their respective secret to the other party's public key. SIDH and CSIDH are both systems that follow this Diffie-Hellman methodology. SIKE is a key encapsulation mechanism, but still shares public keys to create a shared secret. All three of these schemes utilize isogenies between supersingular elliptic curves, but isogenies between ordinary elliptic curves can be used as well. Here, we will primarily explore the use of this innovation in terms of the SIDH and SIKE type of key exchange over isogenies.

In SIDH and SIKE, a prime p is chosen of the form $p=f \cdot 1_A^{e_A} \cdot 1_B^{e_B} \pm 1$, where $1_A$ and $1_B$ are small base isogeny degrees, $e_A$ and $e_B$ are the number of isogenies to compute, and f is a small cofactor to make the number prime. The base elliptic curve is defined over the supersingular elliptic curve $E_0/F_{p^2}$: $y^2=x^3+ax+b$ with order $(p\mp 1)^2$. Lastly, for two parties Alice and Bob, Alice has a torsion basis consisting of two points $P_A$ and $Q_A$ that generate $E_0[1_A^{e_A}]$ and Bob has a torsion basis consisting of two points $P_B$ and $Q_B$ that generate $E_0[1_B^{e_B}]$. The secret computation in SIDH and SIKE is a party's isogeny walk. Here, Alice's secret isogeny walk is $\varphi_A$ and Bob's secret isogeny walk is $\varphi_B$. Alice computes a public key consisting of a new elliptic curve $\varphi_A: E_0 \rightarrow E_A$ and points $\varphi_A(P_B)$ and $\varphi_A(Q_B)$ that are on this elliptic curve.

Similarly, Bob computes a public key consisting of a new elliptic curve $\varphi_B$: $E_0 \rightarrow E_B$ and points $\varphi_B(P_A)$ and $\varphi_B(Q_A)$ that are on this elliptic curve Note that some compression schemes may alter the representation of the curve or torsion points slightly, but E', P', and Q' can still be retrieved. This innovation targets efficient evaluation of the other party's public key before applying the secret isogeny walk. A simple check for SIDH and SIKE-based public keys is to check if P' and Q' are actually on E'. However, for the SIDH and SIKE systems, additional properties can hold to indicate honest computation of this public key. As is shown in FIG. 1, the primary computations we parallelize are methods to check elliptic curve supersingularity as well as the torsion basis' form.

Throughout the description of this innovation, a parallel computing platform is described, which can be described as an electronic computing device with a plurality of functional units, at least one memory unit, and at least one controller to operably implement multiple independent computations. The ability to implement multiple independent computations allows multiple facets of public key validation to be performed concurrently. For instance, if there are two data independent scalar point multiplications, then these two scalar point multiplications can be simultaneously operated by a controller to compute the results at the same time. The primary benefits here are that the computing device's resources are better utilized, and the latencies of the two operations are interleaved together, such that only the slower operation dictates the total processing time.

Figure 2:
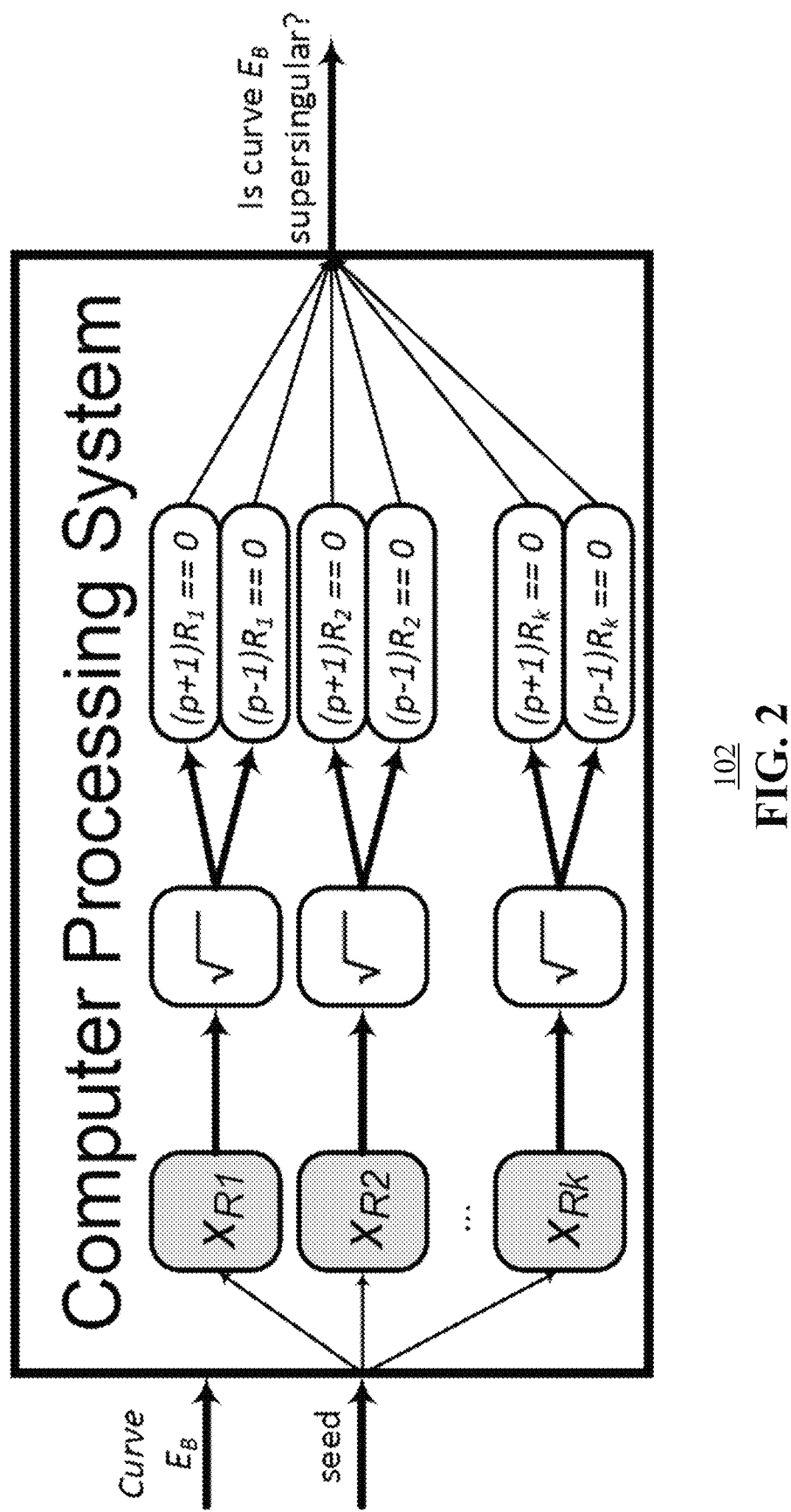
FIG. 2 illustrates a computer processing system for checking if the public key's elliptic curve, $E_B$, is supersingular, which is one interpretation of the supersingularity checker block in FIG. 1. Given some seed on the input, several candidates $x_{R1}, x_{R2}, \ldots x_{Rk}$ are selected. This seed could be as simple as counting from 0, a random number generator, or some internal value. In a parallel fashion, each of these candidate x-coordinates are pushed through the elliptic curve equation given by $E_B$ to solve for $y^2$. In the diagram, each square root sign shows a finite field square root computation, where if the square root exists, then that point $R_i=(x_{Ri}, y_{Ri})$ for a given i exists on curve $E_B$. Lastly, for each valid point, scalar point multiplication units are used to evaluate $(p+1)R_i$ and $(p-1)R_i$. If any of these results equal the point at infinity then the curve is most likely supersingular.

In SIDH, SIKE, and CSIDH, the public key elliptic curve is expected to be a supersingular elliptic curve which has special properties. One method to check supersingularity in elliptic curves defined over quadratic fields is to select a random point R on the elliptic curve and check if $(p-1)R=0$ or $(p+1)R=0$, where 0 is the point at infinity. This method is not full-proof, so multiple random points can be generated and tested. The first innovation in this patent is to test multiple random points in parallel for a given public key. As is shown in FIG. 1, these random points can be generated from a seed, which may be sourced from a random number generator or other method. In the short Weierstrass form of elliptic curves, a random point can be obtained by picking a random x in $F_{p^2}$ and solving for $y=\sqrt{x^3+ax+b}$ using a finite field square root computation, such that $R=(x, y)$. This innovation is to evaluate multiple candidate points over $F_{p^2}$ by using extra computing resources to perform the square root and other computations in parallel. As is shown in FIG. 2, many different points can be evaluated in parallel to ensure that they are points on the curve as well as if they are witnesses to a curve's supersingularity.

Figure 3:
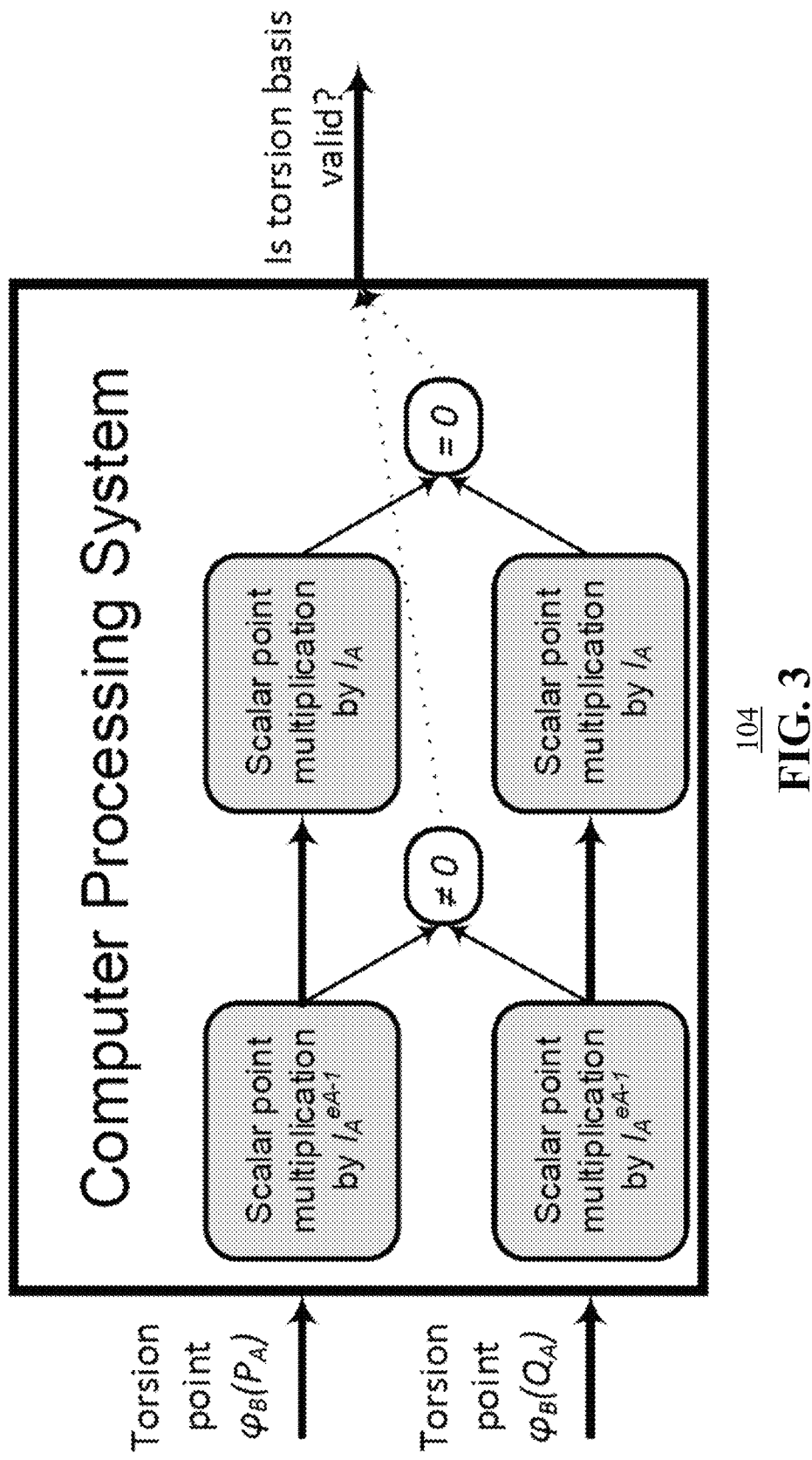
FIG. 3 illustrates a computer processing system for checking if a torsion basis for the SIDH/SIKE setting is valid, which is one interpretation of the torsion basis checker block in FIG. 1. In a parallel fashion, two scalar point multiplications are performed to check that $1_A^{e_A-1} \cdot \varphi_B(P_A) \neq 1_A^{e_A-1} \cdot \varphi_B(Q_A) \neq 0$, where 0 is the point at infinity. Then, in a parallel fashion, two additional scalar point multiplications are performed to check that $1_A^{e_A} \cdot \varphi_B(P_A) = 1_A^{e_A} \cdot \varphi_B(Q_A) = 0$. If these conditions hold, then the torsion basis is of the correct form and valid as it forms a basis.

In SIDH and SIKE, the public key torsion points must be of a certain order with a non-trivial Weil pairing to establish a basis that generates $E_0$ [le]. Namely, Alice's torsion points, $P_A$ and $Q_A$, are each of order $1_A^{e_A}$ and Bob's torsion points, $P_B$ and $Q_B$, are each of order $1_B^{e_B}$. Once it is known that the torsion points received from the other party are indeed on the elliptic curve, these orders can be verified by checking that $l^{e-1}P \neq 0$ and that $l^e P=0$, (similarly for Q) where l and e are selected based on which party's torsion basis is tested. Since there are two torsion points that are sent, two large scalar point multiplications must be performed. By using extra computing resources, this innovation targets parallel evaluation of scalar point multiplications on public keying torsion points. As is shown in FIG. 3, these scalar point multiplications can be effectively parallelized given enough resources. As an example in FIG. 3, there are two distinct sets of scalar point multiplications (where a specific scalar is chosen) that can be parallelized.

In SIDH and SIKE, there are also no data dependencies between checking the order of a random point as well as the torsion points. Thus, one additional innovation here is to concurrently perform the scalar point multiplications for supersingularity $\{(p-1)R=0, (p+1)R=0\}$ and torsion points $\{l^{e-1}P' \neq 0, l^{e-1}Q' \neq 0\}$. Any combinations of these four point multiplications can be effectively scheduled separately and computed simultaneously.

To further illustrate these innovations, we walk through a sample use case. This example is exemplified by FIG. 1, FIG. 2, and FIG. 3. Let us consider that Alice is receiving a public key from Bob that is defined over a quadratic extension field with prime $p=863=2^5 3^3-1$ in the SIDH scenario. Bob's public key sent to Alice consists of the curve $E_B$ and torsion basis $\{\varphi_B(P_A), \varphi_B(Q_A)\}$. First as is shown in FIG. 2, Alice can validate that Bob's curve $E_B$ is supersingular by selecting a random point R on the elliptic curve and checking if $(p-1)R=0$ or $(p+1)R=0$, where 0 is the point at infinity. Alice can use any methodology for finding a point to check. One common practice is to pick a random x-coordinate, whether it be by starting and counting at zero or a random seed, and then seeing if the corresponding y-coordinate exists. Approximately half of x-coordinates will be part of an actual point. For Bob's elliptic curve (in short Weierstrass form) $E_B/F_{p^2}$: $y^2=x^3+a_B x+b_B$, the chosen $x_R$-coordinate is inserted for x, and a square root is performed to solve for $y_R=\sqrt{x_R^3+a_B x_R+b_B}$. If the square root of this value exists, then Alice can choose either the positive or negative square root and the corresponding point is $R=(x_R, y_R)$. Then, after Alice confirms that R is on curve $E_B$, she can verify that curve $E_B$ is supersingular by computing $(p-1)R=0$, $(p+1)R=0$, where 0 is the point at infinity. In the context of this example, Alice computes $862 \cdot R=0$ or $864 \cdot R=0$. If the point multiplication result does not equal the point at infinity, then the supersingularity test is inconclusive for that point. Since there is about a 50% chance that an x-coordinate will have a corresponding y-coordinate as well as a chance for the supersingular check to be inconclusive, it is in Alice's best interest to parallelize these computations. First, she can choose multiple candidates for $x_R$ and parallelize the square root computations to find the corresponding $y_R$ values. For quadratic extension fields, this square root computation generally requires a few finite field exponentiations. Next, with multiple candidate points $R_i$, Alice can test the supersingularity by performing the point multiplications $(p-1)R_i=0$, $(p+1)R_i=0$ for each candidate point in parallel. These parallel operations can be performed in hardware or software, given enough field arithmetic units, memory, and controls.

When it comes to Bob's torsion basis, $\{\varphi_B(P_A), \varphi(Q_A)\}$, Alice expects that both points are of the correct order, $1_A^{e_A}$, and have a non-trivial Weil pairing. One example of computations to verify this is shown in FIG. 3. To check this, Alice can parallelize two more point multiplications, $1_A^{e_A-1} \varphi_B(P_A) \neq 1_A^{e_A-1} \cdot \varphi_B(Q_A) \neq 0$. If these equations hold, then the points have a non-trivial Weil pairing and form a basis generating $E_0[1_A^{e_A}]$. To finish checking that both points have the correct order, Alice checks that $1_A^{e_A} \cdot \varphi_B(P_A) = 1_A^{e_A} \cdot \varphi_B(Q_A) = 0$. In the context of the example, this means that Alice is checking that $2^4 \cdot \varphi_B(P_A) \neq 2^4 \cdot \varphi_B(Q_A) \neq 0$ and $2^5 \cdot \varphi_B(P_A) = 2^5 \cdot \varphi_B(Q_A) = 0$. These scalar point multiplications have approximately half the bitlength of the supersingularity scalar point multiplications, but can still be parallelized with supersingularity checks. Thus, if Alice has k points for the supersingularity check then she is performing k+4 total scalar point multiplications as part of public key validation. Given enough hardware resources, these computations can all be parallelized. Further, with even more resources, Alice could also parallelize the double point multiplication that appears as the first step in the SIDH key agreement step.

The primary prior art for this area is "Efficient algorithms for supersingular isogeny Diffie-Hellman" by Costello et al. that appeared at CRYPTO 2016. Here, these authors gave a methodology for checking if a public key is valid, but their methodology only applies to a specific set of curves known as Montgomery curves. Furthermore, their work does not target high-performance devices that can parallelize the computations. Lastly, they only check supersingularity against a single point, which can fail with a low probability.

What is claimed is:

1. A computer processing system for validating isogeny-based cryptography keys comprising:
    an electronic computing device with an isogeny-based cryptosystem operably configured to validate public keying material including an elliptic curve by simultaneously computing an elliptic curve supersingularity check along with an elliptic curve public point check.

2. The computer processing system according to claim 1, wherein:
    the elliptic curve public point check is a torsion basis check.

3. The computer processing system according to claim 2, wherein the torsion basis check further comprises:
    at least one scalar point multiplication to validate that a plurality of torsion points are of a correct cardinality and generate a basis.

4. The computer processing system according to claim 3, wherein the torsion basis check further comprises:
    a first plurality of scalar point multiplications configured to verify a numerical result uniqueness and not equal to the point at infinity and a second plurality of scalar point multiplications configured to verify equivalence to the point at infinity.

5. The computer processing system according to claim 1, wherein:
    the electronic computing device is a high-performance electronic computing device with a plurality of functional units, at least one memory unit, and at least one controller to operably implement multiple independent computations.

6. The computer processing system according to claim 1, wherein:
    the elliptic curve supersingularity check is configured to find a first plurality of elliptic curve points to verify supersingularity.

7. The computer processing system according to claim 6, wherein the isogeny-based cryptosystem further comprises:
    a random number generator operably configured to generate the first plurality of elliptic curve points.

8. The computer processing system according to claim 6, wherein:
    the isogeny-based cryptosystem is operably configured to use a seed to generate the first plurality of elliptic curve points.

9. The computer processing system according to claim 6, wherein:
    the isogeny-based cryptosystem is operably configured to implement a square root computation simultaneously to check if the first plurality of elliptic curve points are on the elliptic curve.

10. The computer processing system according to claim 9, wherein:
    the isogeny-based cryptosystem is operably configured to implement a scalar point multiplication simultaneously to check if a result from the scalar point multiplication verifies supersingularity.

11. The computer processing system according to claim 10, wherein:
    the isogeny-based cryptosystem is operably configured to perform an additional iteration of finding an additional plurality of elliptic curve points to verify supersingularity, the additional plurality of elliptic curve points are different than the first plurality of elliptic curve points.

12. A computer processing system for validating isogeny-based cryptography keys comprising:
    an electronic computing device with an isogeny-based cryptosystem operably configured to validate public keying material including an elliptic curve by computing an elliptic curve supersingularity check by simultaneously evaluating scalar point multiplication results over a first plurality of elliptic curve points and by utilizing the scalar point multiplication results against a point at infinity.

13. The computer processing system according to claim 12, wherein the isogeny-based cryptosystem further comprises:
    a random number generator operably configured to generate the first plurality of elliptic curve points.

14. The computer processing system according to claim 12, wherein:
    the isogeny-based cryptosystem is operably configured to use a seed to generate the first plurality of elliptic curve points.

15. The computer processing system according to claim 12, wherein:
    the isogeny-based cryptosystem is operably configured to implement a square root computation simultaneously to check if the first plurality of elliptic curve points are on the elliptic curve.

16. The computer processing system according to claim 12, wherein:
    the isogeny-based cryptosystem is operably configured to perform an additional iteration of finding an additional plurality of elliptic curve points to verify supersingularity, the additional plurality of elliptic curve points are different than the first plurality of elliptic curve points.

17. The computer processing system according to claim 12, wherein:
    the electronic computing device is a high-performance electronic computing device with a plurality of functional units, at least one memory unit, and at least one controller to operably implement multiple independent computations.

* * * * *